United States Patent [19]

Schuller et al.

[11] Patent Number: 5,562,430
[45] Date of Patent: Oct. 8, 1996

[54] RECIPROCATING PISTON PUMP WITH A HOUSING BLOCK AND AT LEAST ONE RECIPROCATING PISTON PUMP ELEMENT

[75] Inventors: Wolfgang Schuller, Sachsenheim; Horst Stade, Blaichach; Stefan Seitz, Waltenhofen, all of Germany

[73] Assignee: Robert Bosch GmbH, Stuttgart, Germany

[21] Appl. No.: 588,753

[22] Filed: Jan. 19, 1996

Related U.S. Application Data

[62] Division of Ser. No. 297,078, Aug. 29, 1994.

[30] Foreign Application Priority Data

Aug. 31, 1993 [DE] Germany ............... 43 29 211.9

[51] Int. Cl.⁶ .................................. F04B 21/04
[52] U.S. Cl. ........................... 417/545; 417/552
[58] Field of Search ................... 417/549, 567, 417/545, 552, 554

[56] References Cited

U.S. PATENT DOCUMENTS

| | | |
|---|---|---|
| 3,682,572 | 1/1986 | Yarger . |
| 4,562,798 | 1/1986 | van Os . |
| 5,320,498 | 6/1994 | Fuchida .............. 417/554 X |

FOREIGN PATENT DOCUMENTS

| | | |
|---|---|---|
| 1925307 | 11/1970 | Germany . |
| 3236536 | 4/1984 | Germany . |
| 677538 | 8/1952 | United Kingdom . |
| 2023719 | 1/1980 | United Kingdom . |
| 2248277 | 4/1992 | United Kingdom . |
| WO9308050 | 4/1993 | WIPO . |

*Primary Examiner*—Richard E. Gluck
*Attorney, Agent, or Firm*—Edwin E. Greigg; Ronald E. Greigg

[57] ABSTRACT

A reciprocating piston pump element of a reciprocating piston pump having a piston, a cylinder with a formed-on cylinder head, an outlet valve which adjoins the cylinder head and an outlet valve housing that is secured in the cylinder head in order to form a structural unit. To reduce the amount of structural space required and to reduce the purchase price, the cylinder with the cylinder head and the region of the outlet valve housing enclosing the closure element are embodied in one piece, and in addition to a sealing ring, a further sealing ring of essentially the same diameter is disposed. As a result, a securing means in the form of a bead formed from the material of the housing block, oriented toward the outlet valve chamber, suffices to secure the reciprocating piston pump element inside the bore of the housing block. The reciprocating piston pump element can be used for space-saving, less expensive anti-lock systems in motor vehicle brake systems and can be expanded for traction control.

4 Claims, 2 Drawing Sheets

RECIPROCATING PISTON PUMP WITH A HOUSING BLOCK AND AT LEAST ONE RECIPROCATING PISTON PUMP ELEMENT

This is a divisional of copending application Ser. No. 08/297,078 filed on Aug. 29, 1994.

BACKGROUND OF THE INVENTION

The invention is based on a reciprocating piston pump element of a reciprocating piston pump as defined hereinafter. Such reciprocating piston pump elements are known in the prior art (DE 32 36 536 A1, German Patent Application P 43 20 902.5) and have integrally embodied cylinders and cylinder heads that are embodied as integral components. The outlet valve seats are machined into the cylinder heads. The cylinder heads are adjoined axially by necks, which in turn are adjoined by circularly bounded flanges. The outlet valve housings have tubular extensions that are slipped over the flanges and crimped onto the necks. The tubular extensions are thin-walled and are an aid so that before the cylinders are inserted into the housing blocks, the cylinders and the various outlet valves can be combined into structural units; the advantage is that before this insertion, the closing springs can already be prestressed, so that the valve seat closing elements are protected against being lost. Another advantage is that the outlet valves can be checked for functionality and tightness before being inserted into the housing blocks. In the region of the ends oriented toward the atmosphere, sealing rings are associated with the outlet valve housings, so that these housings additionally have the function of closing elements for the bores of the housing blocks. Once these reciprocating piston pump elements have been inserted into the bores of the housing blocks, the outlet valve housings are pressed against the cylinder heads by means of headless screws. Accordingly, in a pumping operation, such a headless screw is loaded by a force that is at least as strong as the highest pressure generatable by the reciprocating piston pump element, times the cross-sectional area of the bore. In the present example, the reciprocating piston pump element is driven so forcefully that it generates a pressure of up to approximately 300 bar.

Reciprocating piston pump elements of this kind are used for instance in pairs, facing one another, inside housing blocks of anti-lock systems for vehicle brake systems, as in International Patent Reference WO 93/08050. Such housing blocks, because they should be as light in weight as possible, are usually of lightweight metal and accordingly require relatively long threads for the headless screws. Nevertheless, for safety reasons, the threads must be made especially carefully and therefore expensively. As can be seen from FIG. 5 of WO 93/08050, such headless screws claim a disproportionate share of the dimensions of the associated housing block.

OBJECT AND SUMMARY OF THE INVENTION

The reciprocating piston pump element of the reciprocating piston pump as defined herein has the advantage that in its axial direction, with otherwise unchanged diameters of the reciprocating piston pump element, substantially less axial force is exerted. The axial force is essentially caused only by the highest pressure in the cylinder, multiplied by the cross-sectional area of the piston. As a consequence, a more economical and space-saving caulking means is now sufficient to absorb the reduced axial force.

By the provisions recited herein, advantageous further features of and improvements to the reciprocating piston pump element recited are possible. The characteristics of the exemplary embodiment have the advantage that a position of pressure generated by the reciprocating piston pump element in the sealing zones of the two sealing rings results in axial forces of equal magnitude and thus brings about axial force compensation. Accordingly, only that force that corresponds to the driving force acting upon the piston, plus a safety margin, has to be absorbed by the caulking means.

The characteristics set forth recite an exemplary embodiment for installation of the outlet valve. Other characteristics recite a further exemplary embodiment that can be manufactured in a technically simple way.

Further chacteristics indicate a further way to embody the outlet valve.

Other characteristics recite an exemplary embodiment in which different thermal expansions of the housing block relative to the cylinder and its outlet valve are largely kept away from the sealing means this again is a provision that protects the sealing means against an overload.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
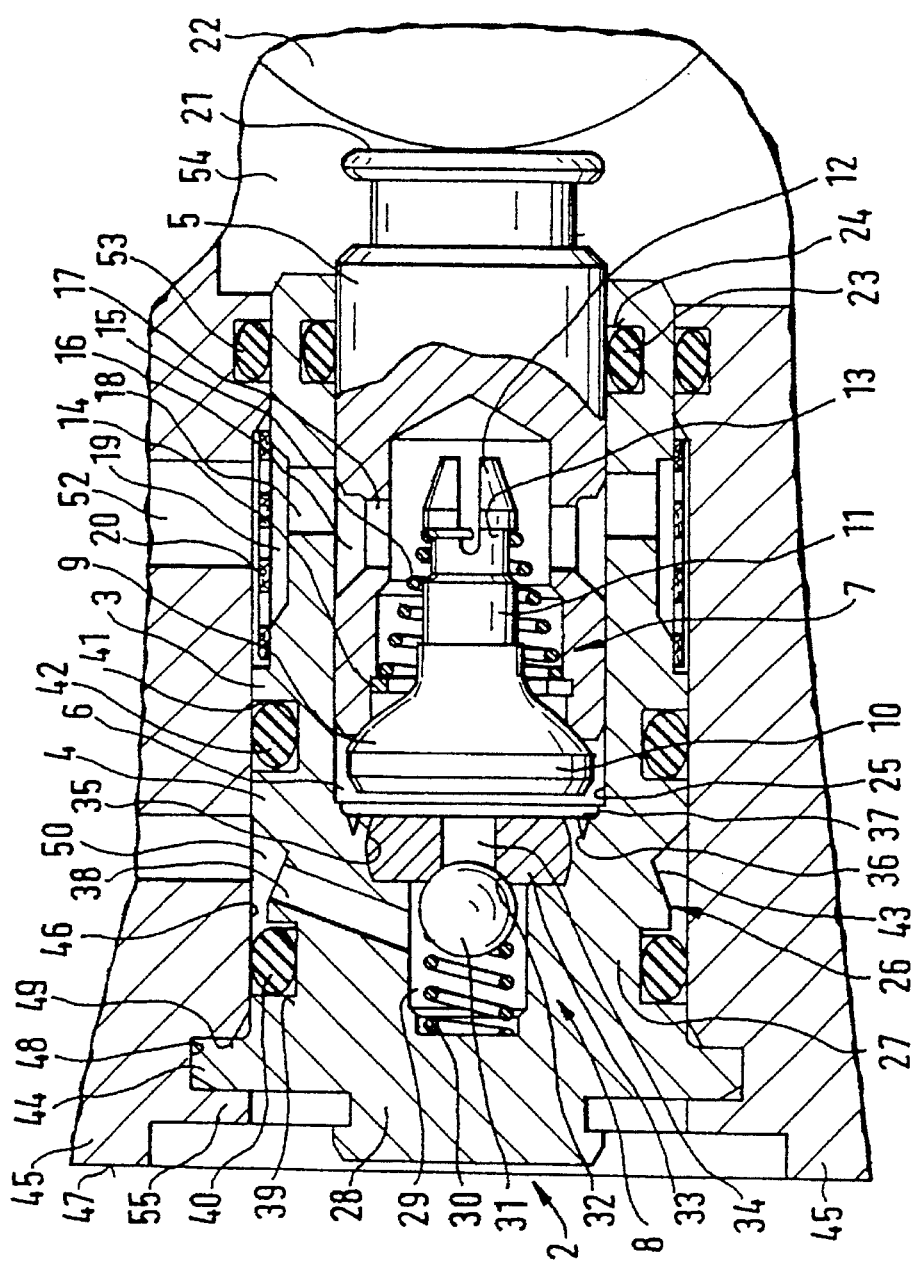
FIG. 1 shows a first exemplary embodiment in longitudinal section.

The reciprocating piston pump element 2 according to the invention shown in FIG. 1 has a cylinder 3, a cylinder head 4, a piston 5 displaceable in the cylinder, a pump chamber 6 defined by the cylinder 3 and the piston 5, an inlet valve 7 that can open toward the pump chamber 6, and an outlet valve 8 that is located in the extension of the longitudinal axis of the cylinder 3 and is connected to the pump chamber 6.

The inlet valve 7 is combined with the piston 5. To that end, the piston 5 is embodied as hollow in the manner of a blind bore, beginning at the pump chamber 6, and has an inlet valve seat 9 on the piston 5. An inlet valve seat closing element 10 is associated with the inlet valve seat 9.

A stem 11 is formed onto the inlet valve seat closing element 10; it protrudes into the piston 5 and has a shoulder 13 in the region of its conically shaped free end 12. In the region of a transition between the inlet valve seat closing element 10 and the stem, a stop ring 14 is disposed inside the piston 5. Between the stop ring 14 and the shoulder 13, a conically embodied inlet valve closing spring 15 is installed with prestressing. For further details, which are not part of the invention, reference is made to German Patent Application P 43 20 902.5 mentioned in the background section. The piston 5 has a circumferential groove 16 on the circumference. This circumferential groove 16 communicates with the inlet valve 7 via two transverse conduits 17.

In alignment with the circumferential groove 16, the cylinder 3 has at least one radial aperture 18 for supplying the inlet valve 7 with liquid to be pumped and put under pressure. In a manner known per se, the radial apertures begin at an annular groove 19, which is machined on the outside of the cylinder 3 and spanned by a hoselike filter element 20. On the end opposite the inlet valve seat 9, the piston 5 has a piston base 21 against which a drivable eccentric 22 acts in a manner known per se. An eccentric 22 of this kind, and its drive, not shown, may be found from the prior art, for instance.

In the exemplary embodiment shown, the piston 5 is fitted into the cylinder 3 with very little radial play in the region of the inlet valve seat 9, so that a so-called gap seal is located between the piston 5 and the cylinder 3. A further gap seal 23 is embodied in the form of a sealing ring that is placed in an annular groove 24 machined into the cylinder 3 on the inside.

As can be seen from FIG. 1, the cylinder 3 is adjoined directly and integrally by the cylinder head 4, because the pump chamber is formed by a blind bore-like cylinder bore 25. In this respect, agreement still exists with the prior art.

The cylinder head 4, which is integral with the cylinder 3, changes into an outlet valve housing 26 with a circumferential region 27 that is integrally embodied with the cylinder head 6 and with an end region 28 that is integrally embodied with the circumferential region 27. Inside the circumferential region 27, bordering on the end region 28, there is a valve chamber 29 in the outlet valve housing 26. The valve chamber 29 receives a closing spring 30 and a valve seat closing body 31, here embodied spherically, to which a valve seat 32 is assigned. The valve seat 32 is machined into a valve seat body 33, which is embodied essentially as an annular disk and on its circumference is formed spherically, for instance. The valve seat body 33 has a central opening 34 beginning at the valve seat 32 and opening into the pump chamber 6. The valve seat body 33 is disposed inside a recess 35, which is machined into the cylinder head 4 beginning at the pump chamber 6 in the direction of the integral outlet valve housing 26. The valve seat body 33 is secured in the axial direction against the closing force of the closing spring 30, which is installed with prestressing, and against hydraulic impingement from the valve chamber 29 by means of at least one holding means 36, which is produced by indenting at least one notch 37 into the cylinder head 4 beginning at the pump chamber 6. An annular notch is advantageous.

Essentially in the radial direction, the circumferential region 27 of the outlet valve housing 26 is pierced by at least one, for instance drilled opening 38. In the axial direction between the opening 38 and the end region 28 of the cylinder 3 with the outlet valve housing 26 which are integrated into one component, a receiving groove 39 for a first sealing ring 40 is provided in the circumferential region of the component. A second receiving groove 41 is disposed radially outside the pump chamber 6 and receives a second sealing ring 42. In the region of the opening 38 and hence between the receiving grooves 39 and 41, the circumferential region 26 has a constriction 43 for deflecting pumped pressure fluid.

Preferably, the receiving grooves 39 and 41 have the same dimensions as one another, as do the sealing rings 40 and 42.

A fastening flange 44 projects radially from the end region 38 of the outlet valve housing 26. The reciprocating piston pump element 2 described is insertable into a housing block 45. The term "housing block" is intended to mean for instance a housing block of an anti-lock brake system or of a combined anti-lock and traction control system.

The term can mean not only such a housing block, which in addition to at least one reciprocating piston pump element of the type according to the invention also receives electrically controllable multiposition valves and/or other hydraulic elements, but also a simple pump housing.

The housing block 45 has a bore 46 for receiving the reciprocating piston pump element 2. This bore 46 is cylindrically embodied in the region of the two sealing rings 40 and 42, on the one hand so as to keep the two sealing rings 40 and 42 under radial tension, and on the other to receive the cylinder 3 in centered fashion along with the formed-on outlet valve housing 26. Beginning at an outer boundary face 47, a stop shoulder 48 precedes the bore 46. This stop shoulder 48 is formed by a bore step 49, of which only a portion of its length is visible in FIG. 1.

Located between the bore 46 and the constriction 43 is an annular chamber 50 that communicates with an outlet conduit 51 disposed in the housing block 45. An inlet conduit 52 is also disposed in the housing block 45 and discharges into the bore 46, in alignment with the filter element 20. Next to the filter element 20 in the direction toward the piston base 21, the bore 26 is bound by a narrower second bore 53, which fits around the cylinder 3 adjacent to the region of the piston base 21. There, a cylinder-housing block seal is provided, so that a chamber 54 within which the eccentric element 22 moves is hydraulically separated from the inlet conduit 52.

The reciprocating piston pump element 2 is thrust into the 46 with the piston base 21 leading, until the securing flange 44 rests on the stop shoulder 48 of the housing block. After that, by means of a metal forming tool, at least one sealing means, such as annular bead 55, is pressed out of the material of the housing block 45 against the securing flange 44. The annular bead 55 and the stop shoulder 48 form securing elements pertaining to the housing block, while the securing flange 44 can be called a securing element pertaining to a cylinder.

It has already been mentioned that the first sealing ring 40 and the second sealing ring 42 rest on the cylindrical bore 46. In the manner desired according to the invention, this means that at an existing pressure in the region between the two sealing rings 40 and 42, those forces that seek to move the sealing rings farther apart from one another are of equal magnitude and are compensated for by material between the cylinder 3 and the integral end region 29 of the outlet valve housing 26. As a result, whenever pressure is generated in the pump chamber 6 by rotation of the eccentric 22 and displacement of the piston 5 toward the cylinder head 4, which pressure opens the outlet valve 8 and through the valve chamber 29 and the opening 38 puts the annular chamber 50 under pressure, a force that is merely equivalent to the force exerted by the eccentric 22 on the piston base 21 is generated in the direction of the at least one annular bead means 55. As can easily be seen from FIG. 1, the cross-sectional area bounded by the cylinder bore 25 is substantially smaller than the cross-sectional area bounded by the bore 46 inside the housing block 45. Consequently the at least one annular bead means 55 is not as heavily loaded as the headless screws in the prior art reciprocating piston pump elements mentioned in the background section.

At least one annular bead means 55 which is embodied like an annularly closed bead has been mentioned. Since if such an annular bead is produced by the motion of only one pressing tool longitudinally of the reciprocating piston pump element, immense driving forces are required, it is naturally also possible to provide more than one annular bead means in segments, in more than one operation. Because the disposition of at least one annular bead means or a plurality of beading means is already familiar in production technology in the field of hydraulics, one skilled in the art can select from among the exemplary embodiments known in that field.

Figure 2:
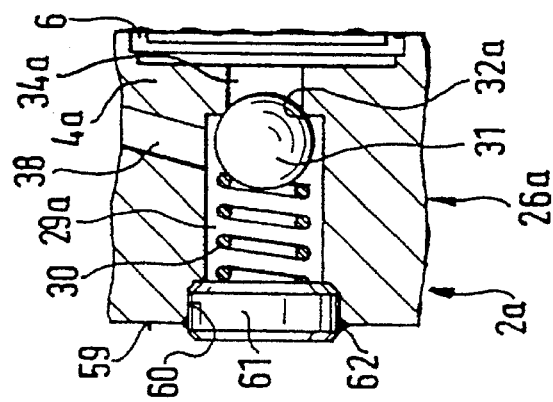
FIG. 2 shows a detail for a second exemplary embodiment in longitudinal section.

FIG. 2 shows a second exemplary embodiment for an outlet valve housing 26a, which again integrally adjoins a cylinder, not shown here. An opening 34a which is adjoined by a valve seat 32a begins at the pump chamber 6 of this cylinder. This valve seat 32a is again assigned a valve seat closing body 31, which for instance is spherical and which is loaded by a closing spring 30. Both the valve seat closing body 31 and the closing spring 30 are located in a valve chamber 29a, from which an opening 38 extends, again essentially in the radial direction. Since in this exemplary embodiment the valve seat 32a is formed into the cylinder head 4a opposite the pump chamber 6, its manufacture requires that a tool be capable of being introduced into the valve chamber 29a. To that end, the outlet valve housing 26a has a bore step 60, beginning at the face end 59, in the extension of the valve chamber 29a. Once the valve closing body 31 and the closing spring 30 have been introduced, the bore step 60 can be closed by a plug 61. For positional securing and hydraulic sealing, the plug 61 is fixed to the valve housing 26a, for instance by a weld seam 62. In accordance with professional experience in joining technology, such a weld seam may naturally be replaced by a welded or soldered connection, not shown. Alternatively, in terms of the exemplary embodiment of FIG. 1, a beaded means may be provided in the region of its valve seat body 33 and the cylinder head 4.

Otherwise, the integral combination beginning with the cylinder, not shown, through the cylinder head 4a to the face end 59 may be assigned a securing flange in the manner described for FIG. 1, and the receiving grooves 39 and 41 shown in FIG. 1 may also be provided. As a result, the reciprocating piston pump element 2a obtained in this way can likewise be built into the housing block 45 of FIG. 1. It is accordingly apparent that in terms of the invention it is critical merely that hydraulically dictated axial thrust in the direction of the at least one bead means 55 be kept as slight as possible by means of a union of materials of the cylinder 3, to be sealed off from the housing block, and the region of the outlet valve housing 26 or 26a, which is further embodied on the circumference in such a way that it forms a closing element for tightly closing off the bore 46 of the housing block 45.

As already mentioned in the background section, the housing block 45 preferably comprises lightweight metal, such as aluminum. For technical reasons, however, the cylinder 3 should be made from steel. Upon even uniform heating of the cylinder 3 and the housing block 45, different changes in length of these elements ensue, which in the exemplary embodiment of FIG. 1 are not a problem since the two securing elements of the housing block, that is, the stop shoulder 48 and the bead means 55, are spaced apart by only a short distance from one another, into which space the securing flange 44 protrudes. Thermally dictated changes in dimension therefore do not as yet cause differences in dimension that shake the securing means apart. Next to the securing flange 44, displacements between the components comprising the cylinder 3 and cylinder head 4 and the housing block 45 are possible, because of the dispositions of the sealing rings 40 and 42 as well 53, which like sealing rings of hydraulic cylinder pistons are known to allow axial displacements.

Figure 3:
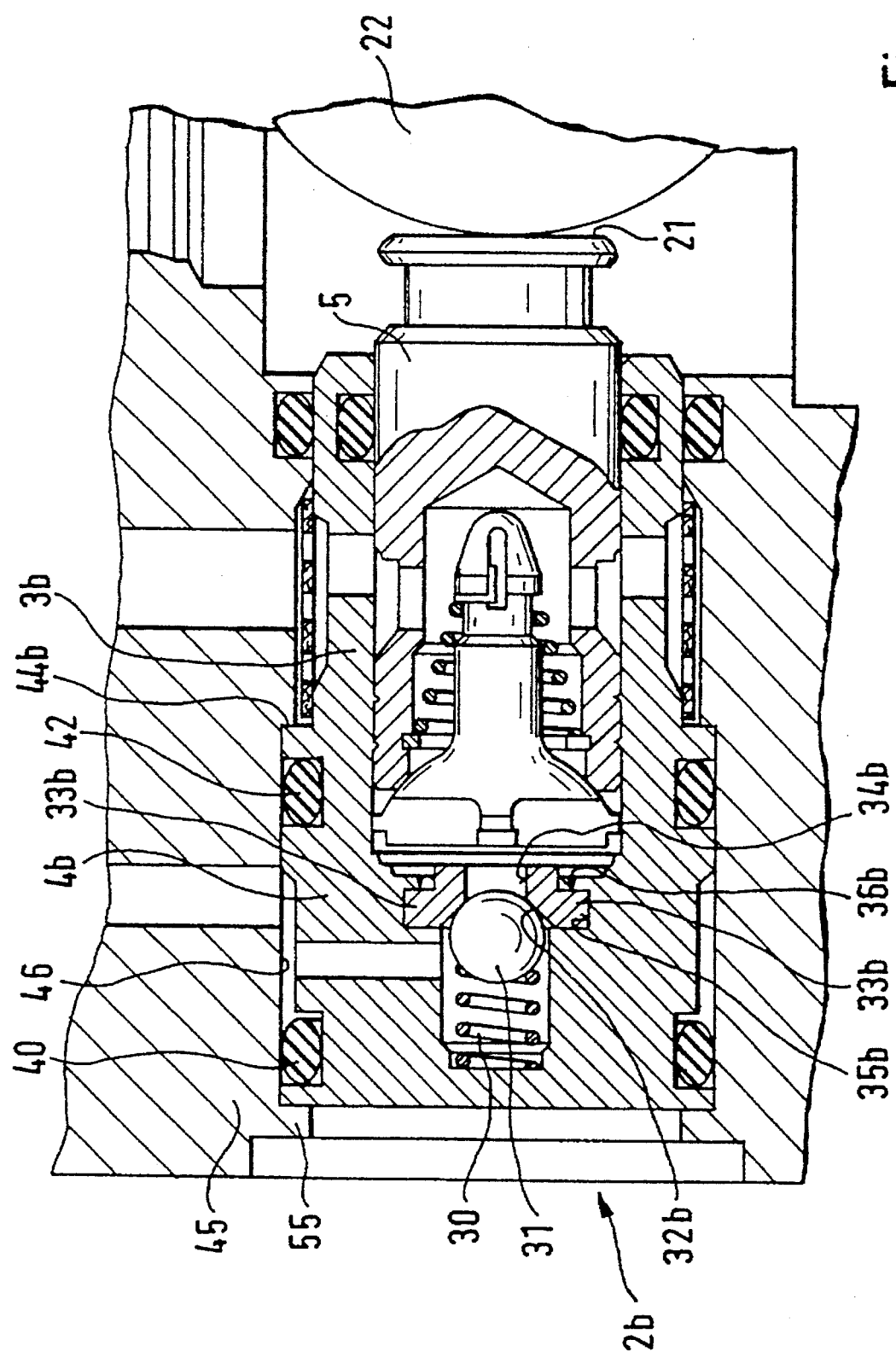
FIG. 3 shows a third exemplary embodiment.

In order to clearly show the interchangeability of at least one securing means embodied in the form of a bead, a valve seat body 33b that receives a valve seat 32b and has an opening 34b is embodied cylindrically on its circumference, in an exemplary embodiment for a reciprocating piston pump element 2b shown in FIG. 3, and is inserted into a cylindrically bounded recess 35b which is embodied in the manner of a stepped bore. For fixation of the valve seat body 33b, material of the cylinder head 4b is forced against the valve seat body 33b, by means of a pressing tool not shown that has an annularly closed end face, thus creating the securing means 36b visible in FIG. 3, whose geometrical embodiment except for the different dimensions matches the beadlike securing means 55, which is intended to fix the reciprocating piston pump element 2b in the bore 46. On the other hand, if the point of departure is the type of securing means for the valve seat body 33 of FIG. 1 by pressing in notches 37 or an annular notch, then naturally the possibility also exists of fixing the reciprocating piston pump element 2 or 2b inside the bore 46 receiving it by making notches.

In the exemplary embodiment of FIG. 3, the securing flange 44 of FIG. 1 is missing; and therefore, in the way known from the prior art, a shoulder 44b is disposed on the outside of the cylinder 3b and forms an axially acting securing means. Unlike the shoulder found in DE 32 36 536 A1 and also acting as an axial stop, the shoulder 44b need not produce any sealing between the cylinder 3b and the housing block 45. This is because the cylinder 3b is again assigned a sealing ring 42 of the kind described in conjunction with FIG. 1. Hence the shoulder 44b serves merely as one of the securing means for the reciprocating piston pump element 2b. Hence pressing the shoulder 44b against the housing block 45 by means of the securing means 55 for the sake of more-secure sealing is unnecessary.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A reciprocating piston pump, having a housing block, an inlet in said housing block, and at least one reciprocating piston pump element that is insertable into a bore of the housing block where it is axially secured by means of a securing means; a cylinder which is sealed off relative to the bore of the housing block; a piston displaceable in the cylinder; a pump chamber bounded by the cylinder and piston; an outlet, an outlet valve in said outlet, said outlet valve is connected to the pump chamber of the cylinder in an extension of a longitudinal axis of the cylinder and which has a valve seat, a valve seat closing body, a closing spring, and an outlet valve housing, which outlet valve housing has an end region and together with a sealing ring forms a closure element for the bore, the cylinder (3) and a circumferential region (27) of the outlet valve housing (26, 26a) are embodied as an integral component, and that at least one securing means, acting against the outlet valve housing (26, 26a), is provided as one of the securing means, and formed from a material of the housing block (45), a bore step (60) is machined into the end region (59) of the outlet valve housing (26a) and is closed by means of a plug (61); the closing spring (30) is supported on the plug (61); and the valve seat (32) is machined into the cylinder head (4a).

2. A reciprocating piston pump element as defined by claim 1, in which the reciprocating piston pump element (2, 2a) has a radially projecting securing flange (44) in an end region (28, 59), toward which a bore step (49) of the housing block (45) is oriented.

3. A reciprocating piston pump, having a housing block, an inlet in said housing block, and at least one reciprocating piston pump element that is insertable into a bore of the housing block where it is axially secured by means of a securing means; a cylinder which is sealed off relative to the bore of the housing block; a piston displaceable in the cylinder; a pump chamber bounded by the cylinder and piston; an outlet, an outlet valve in said outlet, said outlet valve is connected to the pump chamber of the cylinder in an extension of a longitudinal axis of the cylinder and which has a valve seat, said valve seat (32) of the outlet valve (8) is located in a valve seat body (33, 33b) that is built into a cylinder head (4) through the pump chamber (6), a valve seat closing body, said valve seat closing body (33) is embodied rotationally symmetrically and inserted into a recess (35), which is located in the cylinder head (4), and fixed by means of a sealing means (36; 36b), a closing spring, and an outlet valve housing, which outlet valve housing has an end region and together with a sealing ring forms a closure element for the bore, the cylinder (3) and a circumferential region (27) of the outlet valve housing (26, 26a) are embodied as an integral component, and that at least one securing means, acting against the outlet valve housing (26, 26a), is provided as one of the securing means, and formed from a material of the housing block (45), and a plug (61) secured in an end of said bore in a firmly engaged manner.

4. A reciprocating piston pump element as defined by claim 3, in which the reciprocating piston pump element (2, 2a) has a radially projecting securing flange (44) in an end region (28, 59), toward which a bore step (49) of the housing block (45) is oriented.

\* \* \* \* \*